United States Patent
Scott et al.

(10) Patent No.: US 9,407,671 B2
(45) Date of Patent: Aug. 2, 2016

(54) ACKNOWLEDGEMENT MESSAGE MONITORING

(71) Applicant: Metaswitch Networks Limited, Middlesex (GB)

(72) Inventors: Philip Anthony Scott, London (GB); Richard David Sugarman, Hertfordshire (GB)

(73) Assignee: Metaswitch Networks Limited, London (GB)

( * ) Notice: Subject to any disclaimer, the term of this patent is extended or adjusted under 35 U.S.C. 154(b) by 322 days.

(21) Appl. No.: 13/971,725

(22) Filed: Aug. 20, 2013

(65) Prior Publication Data

US 2014/0059239 A1   Feb. 27, 2014

(51) Int. Cl.
*G06F 15/16*   (2006.01)
*H04L 29/06*   (2006.01)
*H04L 12/24*   (2006.01)

(52) U.S. Cl.
CPC ........ *H04L 65/1069* (2013.01); *H04L 41/0677* (2013.01); *H04L 65/1006* (2013.01)

(58) Field of Classification Search
CPC .................................................. H04L 65/1069
See application file for complete search history.

(56) References Cited

U.S. PATENT DOCUMENTS

| | | | |
|---|---|---|---|
| 2009/0043724 A1 | 2/2009 | Chesla | |
| 2010/0054158 A1* | 3/2010 | Mathai et al. | 370/259 |
| 2010/0064172 A1* | 3/2010 | George et al. | 714/15 |
| 2010/0070563 A1* | 3/2010 | Baker et al. | 709/203 |
| 2011/0087791 A1* | 4/2011 | George et al. | 709/229 |
| 2014/0095922 A1* | 4/2014 | Baker | H04L 67/14 714/4.2 |
| 2014/0164645 A1* | 6/2014 | Palani | 709/242 |

FOREIGN PATENT DOCUMENTS

| | | |
|---|---|---|
| CN | 101854333 | 10/2010 |
| EP | 2209283 | 7/2010 |
| WO | WO2008092088 | 7/2008 |

* cited by examiner

*Primary Examiner* — Moustafa M Meky
*Assistant Examiner* — Sm Z Islam
(74) *Attorney, Agent, or Firm* — Stetina Brunda Garred & Brucker

(57) ABSTRACT

The invention relates to a system and method for monitoring a handshaking exchange between a call initiator and a call recipient to determine if handshaking has failed, to avoid repeated failed calls between the call initiator and the call recipient.

20 Claims, 3 Drawing Sheets

ACKNOWLEDGEMENT MESSAGE MONITORING

CROSS-REFERENCE TO RELATED APPLICATIONS

Not Applicable

STATEMENT RE: FEDERALLY SPONSORED RESEARCH/DEVELOPMENT

Not Applicable

FIELD OF THE INVENTION

The present invention relates to managing communication between interconnected electronic devices and particularly to the initiation of communication sessions between them and managing communication issues.

BACKGROUND

Before two interconnected electronic devices can pass data between one another it is typical for them to communicate with one another to notify each other of their presence and their readiness to communicate. This preparatory process is known as handshaking and involves an exchange of preparatory messages between the two devices. If this exchange is successfully performed, a communications session between the two devices can be initiated and data can be passed between the two devices. Motivation for establishing such communications are numerous including the streaming of video data from a Server to Client, the exchange of voice data for Internet telephony purposes or remote file transfer.

Numerous different protocols for different applications utilise handshaking. One such protocol is SIP (Session Initiation Protocol) (see IETF RFC 3261). This protocol involves the use of a three-way handshake in order the initiate a session or call. A diagrammatic representation of an example of the handshake used to set up a call can be seen in FIG. 1. In this example, the handshake involves the Client transmitting an "INVITE" request message to the Server A, inviting the Server to initiate a session. Server A responds by sending a "200 OK" response to the Client. The Client therefore knows that Server A is online and ready to initiate a session. The Client responds to the "200 OK" message by sending an "ACK" message to Server A. The Client then considers the communication session to be active and readies itself to transmit and receive streams of data to and from Server A.

A weakness with this method is that no response or acknowledgement of the "ACK" message is sent by Server A and so the Client must assume that the ACK message is received. Server A may go into a state where it cannot receive data, for example due to a network failure or due to Server A crashing, after Server A has transmitted the "200 OK" response, see FIG. 2. In this case the Client will consider the three-way handshake to be complete, since Server A is not expected to send a response to the "ACK" message and the Client has no way of knowing of the failure of the delivery of the "ACK" message. The Client therefore assumes the call is active and proceeds to send data. However, as the Server is not available, any data will not be received.

It is common practice for electronic devices to refer to each other using domain names or hostnames. Domain names are resolved into IP addresses using DNS lookup tables, usually stored on DNS Servers which are updated as an IP address changes. However, to avoid frequent and repeated references to the same data, devices can keep logs of domain name lookup results in a local DNS cache. In the future, when trying to resolve a previously encountered domain name, the Client will first consult the locally stored DNS cache thus negating the need to consult the DNS Server. If no entry for a given domain name exists in the DNS cache, the DNS server will be consulted. This method can greatly accelerate the domain name resolution process. However, in this scenario, the use of a DNS cache introduces further problems.

In the scenario depicted in FIG. 3 the Client attempts to handshake with a Server corresponding to the domain name "sip.example.com". The Client performs a DNS lookup (since initially there is no entry in the DNS code for this domain) which returns two IP addresses, "1.2.3.4" and also "5.6.7.8". IP address 1.2.3.4 is selected and a record of "sip.example.com" resolving to "1.2.3.4" is added to the DNS cache. The Client transmits (S1) an "INVITE" message to the IP address "1.2.3.4", where it is received by Server A. Server A responds (S2) by sending a "200 OK" message to the Client. The "200 OK" message includes a contact address (in this case sip.other.com) for the Client to use for further communication. After sending the "200 OK" message, Server A goes offline (S3) such that it cannot receive data from the Client.

The Client has no entries in the DNS cache for "sip.other.com" and so performs a DNS lookup resolving it to "1.2.3.4" and "5.6.7.8". The resolution of "sip.other.com" resolving to "1.2.3.4" is added to the DNS cache. The Client sends the "ACK" message to "1.2.3.4" but it is never received. The Client believes that the session is active but the Server is either unavailable or does not receive the "ACK" message and so does not consider the handshake complete.

The Client then sends (S5) a new "INVITE" message to "sip.example.com" at "1.2.3.4" as stored in the DNS cache. With Server A unable to receive data, no "200 OK" message is sent back to the Client. After a period of time, the Client concludes that there is a problem at "1.2.3.4" and that the Server at this address is unavailable. The Client deletes this entry from the DNS cache.

The Client then performs a new DNS lookup for "sip.example.com". Based on the lookup, the Client obtains the alternative IP address, "5.6.7.8" as the resolution for "sip.example.com" and adds this result to the DNS cache. The Client then transmits (S6) the "INVITE" message to "5.6.7.8" where it is received by Server B.

Server B responds (S7) to the Client with an "200 OK" message containing the contact header specifying the contact domain name "sip.other.com". The Client receives this message and looks up the address for sip.other.com in its DNS cache which returns address 1.2.3.4. The Client then sends (S8) an "ACK" message to "sip.other.com" at "1.2.3.4". This message does not reach its destination as this IP address corresponds to the unreachable Server A.

Under these circumstances the "ACK" will never be delivered as Server A is unavailable and the DNS cache entry for "sip.other.com" will never be renewed since the Client does not receive any information regarding the failure of the delivery of the "ACK" message to "1.2.3.4". Steps S6 to S8 can repeat numerous times with the handshake failing each time because the cache entry for "sip.other.com" is never freed. This will prevent a successful call being set up between the Client and Server B.

An alternative protocol, SCTP (Streaming Control Transport Protocol), exists which uses the concept of counting the number of transmissions to detect failure of a path or association. This protocol acts as a faster way to detect transport failures for SCTP as the timeout periods for connected transports are often quite large. It is only used by the transport layer of a device however and does not provide enough information to trigger failure of a specific message/signal that is sent by a device. One solution is to avoid the use of DNS hostnames and simply sent the IP address in the "200 OK" message but this is problematic because it is not always possible to control the Server operation which may not be in the user's own network and also there are advantages to using hostnames rather than IP addresses.

Another option is to disable DNS cache lookups for ACK requests but this results in a significant performance degradation for the SIP Client.

The present invention aims to ameliorate some of the problems with the above-referenced system.

BRIEF SUMMARY

According to the present invention there is provided a method for monitoring the set-up of a communication link, the method comprising: a call initiator sending a call initialisation message to a recipient; the recipient sending a response message in response to the call initialisation message; and the call initiator sending an acknowledgement message to the recipient in response to the response message, the method further comprising: the recipient sending one or more further response messages if no acknowledgement message is received; the call initiator sending an acknowledgement message to the recipient in response to each of said further response messages; and determining that a fault condition exists after the call initiator receives a predetermined number of further response messages.

The present invention avoids repeated failure of call set up messages by identifying that acknowledgment messages have not been received by the recipient and that there is a fault condition. As a result, preventative measures can be taken to avoid subsequent calls failing or to rectify the problem to ensure subsequent calls are established successfully.

Preferably, the recipient sends each further response message after a predetermined delay, if no acknowledgement message is received.

The recipient may stop sending said further response messages after a timeout period has elapsed. This prevents a completely broken link from causing the further response messages to be sent perpetually.

The response message may include an identifier associated with the IP address of the recipient and the call initiator may include a cache for storing associations between IP addresses and identifiers. In this way, when a fault condition is identified, the call initiator can determine the IP address associated with the identifier included in the further response message to be invalid.

In the above situation, the call initiator can clear the invalid IP address associated with the identifier.

The call initiator can perform a lookup to identify an IP address associated with an address identifier if the cache has no valid IP address associated with an identifier. This means that if no previous IP address has been cached or if an invalid IP address has been deleted from the cache, a further request can still succeed by referring to an external lookup such as a DNS server. The IP address obtained can then be used to update the cache.

The present invention also provides a method of controlling a call initiator in a communication system, the method comprising: sending a call initialisation message to a recipient; receiving response messages from said recipient in response to the call initialisation message; and sending an acknowledgement message to said recipient in response to the response message, the method further comprising: sending a further acknowledgement message to the recipient in response to each further response messages received from said recipient; and determining that a fault condition exists after the call initiator receives a predetermined number of further response messages.

In the above method, the response message can include an identifier associated with the IP address of the recipient. The method may further include maintaining a cache for storing associations between IP addresses and identifiers, and upon the identification of a fault condition, determining that the IP address associated with the identifier included in the further response message to be invalid. The method may then include clearing the invalid IP address associated with the identifier from the cache.

The present invention may also include a method of controlling a call recipient in a communication system, the method comprising: receiving a call initialisation message from a call initiator; sending a response message in response to the call initialisation message; and sending one or more further response messages if no acknowledgement message is received from the call initiator.

The above method of controlling a call initiator and a call recipient are clearly able to work cooperatively as part of a call system.

The present invention may be used to establish calls in any number of systems or protocols but is particularly applicable to use with the SIP protocol. In this case, the call initialisation message is a SIP "INVITE" message, the response message is a SIP "200 OK" message and the acknowledgement message is a SIP "ACK" message.

The present invention also provides a system for controlling a set-up of a communication link, the system comprising: a call initiator; and a recipient, wherein the call initiator is arranged to send a call initialisation message for reception by the recipient; the recipient is arranged for sending a response message in response to the call initialisation message; the call initiator is arranged for sending an acknowledgement message to the recipient in response to the response message, the recipient is arranged for sending one or more further response messages if no acknowledgement message is received from the recipient; the call initiator is arranged for sending an acknowledgement message to the recipient in response to each of said further response messages; and the call initiator is further arranged for determining that a fault condition exists after the call initiator receives a predetermined number of further response messages.

The system may further be adapted such that a received response message includes an identifier associated with the IP address of the recipient and the call initiator comprises a cache to store associations between IP addresses and said identifier, and wherein, upon determining that a fault condition exists, the call initiator determines the IP address associated with the identifier included in the further response message to be invalid.

The system may further be arranged to perform a lookup to identify an IP address associated with said identifier if the cache does not already have a valid IP address associated with the identifier stored. Once it has obtained an IP address, it can then store the IP address in the cache. The IP address can be obtained from a number of possible locations which may be local to the machine hosting the cache or a remote device accessed through a LAN or WAN such as the Internet.

The call initiator is preferably arranged to clear the invalid IP address associated with the associated identifier from said cache.

The present invention further provides a communication device for communicating with a recipient device comprising: a call initiator arranged to send a call initialisation message to a recipient; and reception means for receiving response messages from a recipient, wherein the call initiator is arranged to send an acknowledgement message when a response message is received by said reception means, the call initiator is further arranged to send further acknowledgement messages to the recipient in response to receipt of further response messages from the recipient; and the communication device determines that a fault exists after the reception means receives a predetermined number of further response messages, sent by the recipient when it does not receive an acknowledgement message from the call initiator.

Preferably a received response message includes an identifier associated with the IP address of the recipient, and the call initiator comprises a cache to store associations between IP addresses and said identifier. In this way, upon determining that a fault exists, the call initiator is able to establish that the IP address associated with the identifier included in the further response message is invalid.

Advantageously, the communication device is further arranged to perform a lookup to identify an IP address associated with the identifier if the cache has no valid IP address associated with the identifier and store the IP address contained in the cache.

The call initiator in the communication device preferably clears the invalid IP address associated with the associated identifier from said cache.

The present invention further provides a communication device for communicating with a call initiating device comprising: a receiver for receiving messages from a call initiating device; and a responder arranged to send a response message to the call initiating device in response to a received call initialisation message, wherein the responder is further arranged to send one or more further response messages if no acknowledgement message is received from the call initiator in response to the response message. In this way, the call initiator can determine that a fault condition exists and take steps to deal with as described above.

BRIEF DESCRIPTION OF THE DRAWINGS

A specific embodiment of the invention will now be described in more detail with reference to the attached drawings in which.

DETAILED DESCRIPTION

Figure 1:
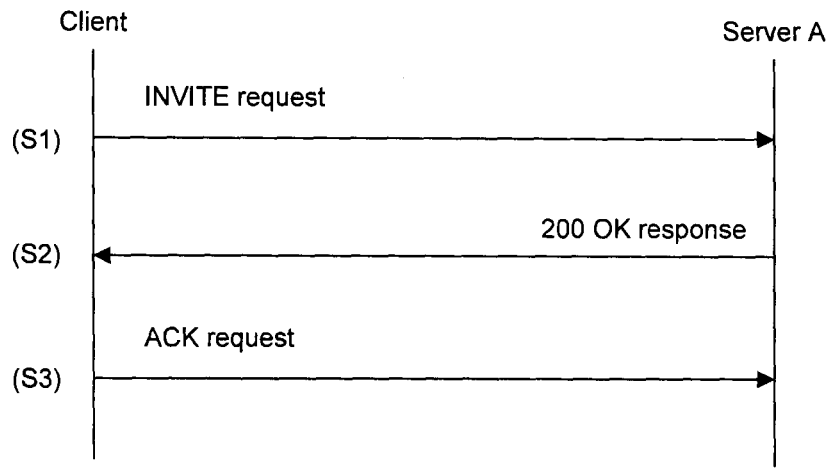
FIG. 1 illustrates a three-way SIP protocol handshake.
Figure 2:
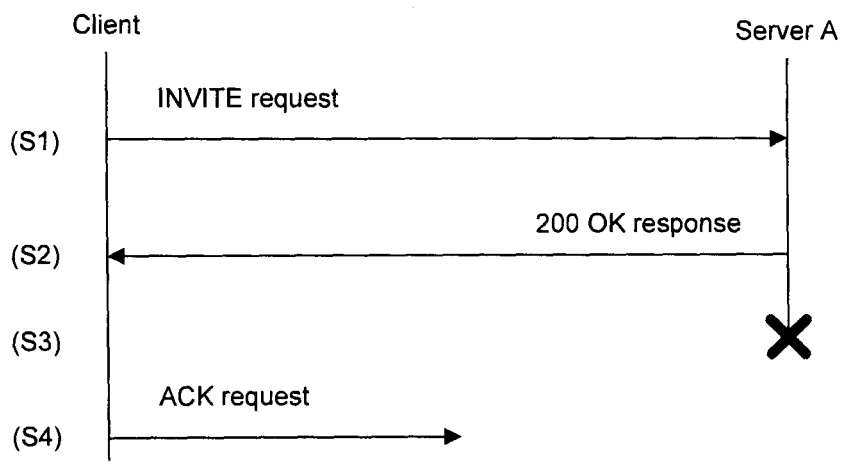
FIG. 2 illustrates an unsuccessful three-way SIP protocol handshake.
Figure 3:
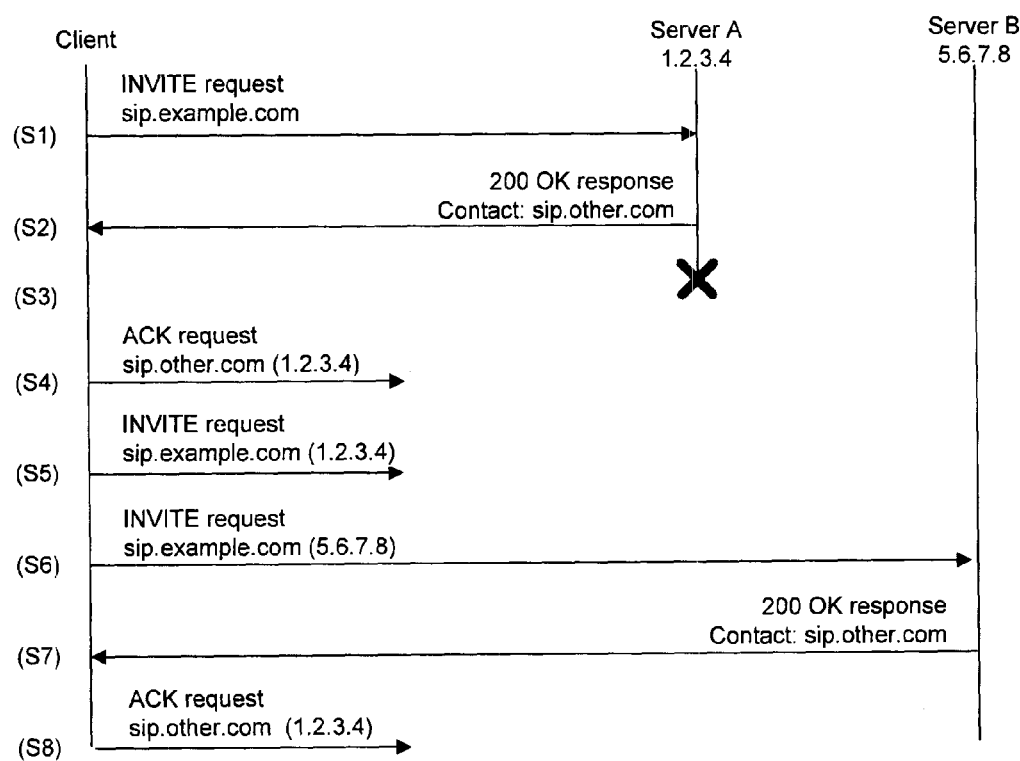
FIG. 3 illustrates repeated call failures with a SIP protocol handshake incorporating DNS caching.

The scenario depicted in FIG. 3 results in the situation that handshaking with Server B at "5.6.7.8" begins. Server B transmits a "200 OK" message to the Client specifying the hostname "sip.other.com". The Client responds to this message by sending an "ACK" message to "sip.other.com", which according to the Client DNS cache resolves to "1.2.3.4" which is uncontactable. With no information telling the Client of the failure of "sip.other.com" at "1.2.3.4", the "ACK" message is sent but never delivered.

Since the Client is unaware that the ACK message has not been received by Server 1.2.3.4, the Client believes that the handshake was successful and that the call is active. Steps S6 to S8 may be repeated a number of times for further calls with each subsequent handshake attempt appearing to the Client to be successful but in reality not succeeding due to the DNS cache data identifying the failed Server 1.2.3.4. Unless the DNS cache information is reset by some other mechanism, the Client will never be able to successfully set up a call with that host.

Figure 4:
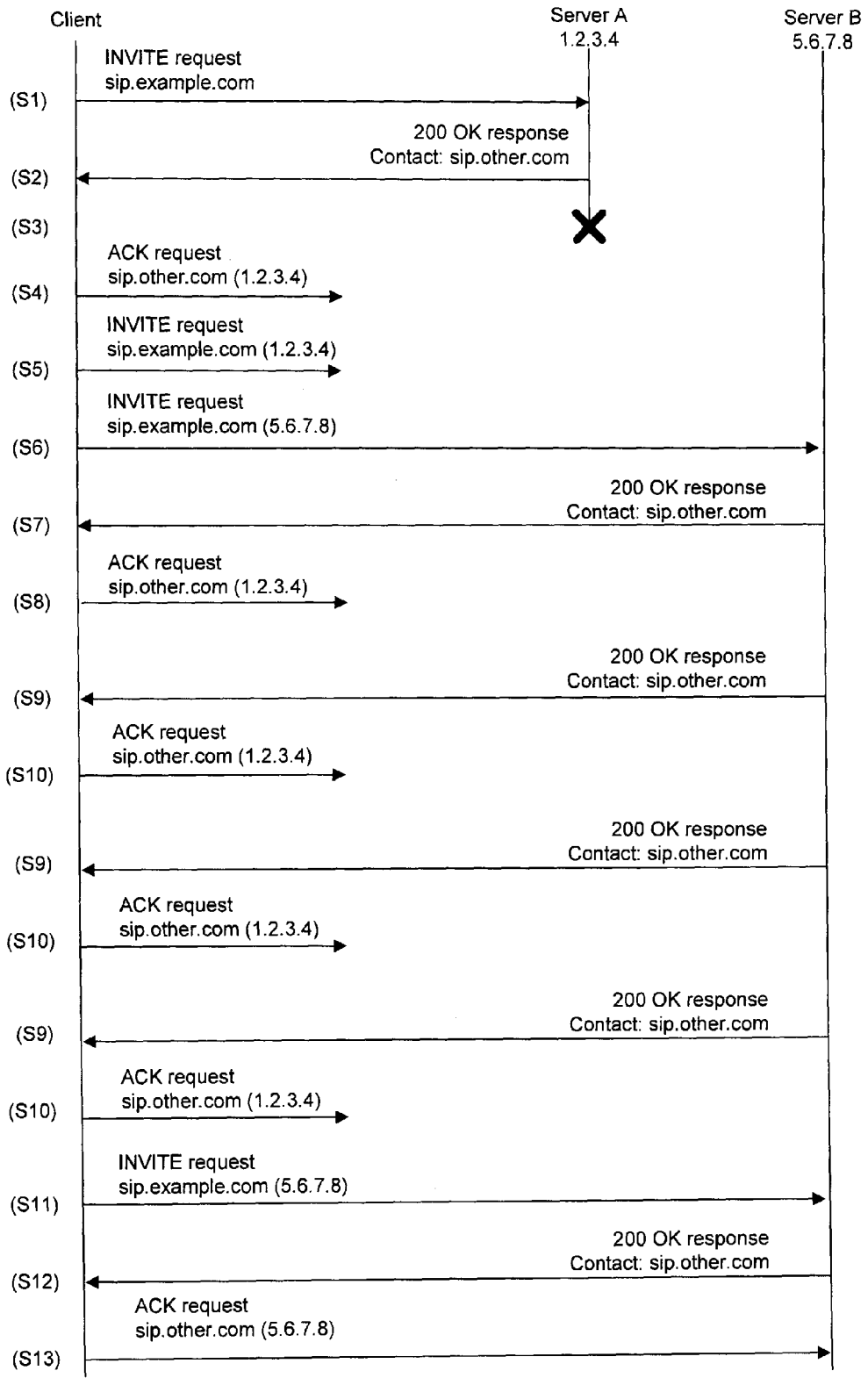
FIG. 4 illustrates a modified SIP protocol handshake incorporating DNS caching according to the present invention.

FIG. 4 shows the operation of a modified protocol according to the present invention. Steps S1 to S8 are similar to those in FIG. 3 and in that respect, the basic operation of the modified protocol is similar to that of existing protocol. In FIG. 4, after step S8, the previous protocol results in the Client assuming that a satisfactory handshake had been completed but with the Server B effectively assuming that handshaking had failed because it had not received an ACK request.

However according to the modified protocol, if after a period of time, Server B does not receive an ACK request from the Client, it resends (S9) a "200 OK" response similar to step S7. The SIP protocol dictates that a Client must send an ACK request in response to all "200 OK" responses, so the Client responds (S10) with an ACK request. However, as the client is still holding the address 1.2.3.4 for Server B the ACK request is not received by Server B. Server B does not receive the ACK request and so after a period of time it again sends a 200 OK response.

Therefore in response to an "INVITE" message, Server B will repeatedly send out "200 OK" messages at intervals until it receives an "ACK" message from the Client or some other timeout mechanism stops it. Correspondingly, the Client will receive the "200 OK" messages and respond to each by transmitting an "ACK" message to the IP address in the DNS cache. Consequently, if the Client receives more than a certain number of "200 OK" messages, it can assume that the "ACK" messages have not been delivered and so take action to correct its DNS cache.

In the example of FIG. 4, the Client is configured to accept three transmissions of the "200 OK" response message before taking remedial action. When the fourth 200 OK response is received, the Client sends the ACK request as before (this is mandatory according to the standard protocol) but then initiates steps to rectify the invalid data in the DNS cache. The Client therefore clears the data stored in the DNS cache for host sip.other.com and refers to an external DNS Server to refresh the information about host sip.other.com. In this instance, the DNS Server should provide the Client with the alternative IP address, 5.6.7.8, for Server B.

Subsequently, the Client attempts to initiate a new call and sends an INVITE request (S11) to sip.example.com. It can obtain the IP address for sip.example.com from its DNS cache which will provide the correct IP address, in this instance 5.6.7.8. Server B receives the INVITE request and responds (S12) with a 200 OK response identifying the contact host name sip.other.com. In response to the "200 OK" response the Client sends (S13) an ACK request destined for sip.other.com. It refers to its DNS cache for this host name but as the entry has been deleted, it must carry out a new DNS lookup. The DNS Server should have been updated to reflect that Server A is no longer available and so, in this example, the lookup only returns a single address (5.6.7.8) to which the ACK request is sent in step S13. The new IP address for sip.other.com is then added to the DNS cache indicating that it resolves to 5.6.7.8, the address of Server B.

Assuming Server B is still online and able to receive the ACK request, the handshake will be completed and the call will be successfully established. This means that only the original call will have failed to complete the handshake but subsequent calls do successfully initiate.

The embodiment above is described in relation to the SIP protocol but it will be appreciated that the invention may be applied to other situations where three-way handshaking is used to establish a connection and where receipt of the final acknowledgement is assumed.

In the embodiment above, the client determines a problem to have occurred after receiving a predetermined number of "200 OK" messages but other mechanisms may be employed to determine that the ACK messages are not being received. For example, the client may react if it receives a "200 OK" message a predetermined time after the initial INVITE message.

The Server B repeats the sending of the "200 OK" messages in the above embodiment until it receives an ACK message. However, it may stop sending the messages after a predetermined time or number of resends to recognise the possibility that some other problem may be preventing communication between the client and the server.

In the embodiment above, sip.example.com and sip.other.com are used as exemplary domain names but relate to the same server. Different host names may be used for the same server for a variety of reasons as is well known in the field. In addition, proxy servers may be included on the signalling path between the client and the recipient. The scope of this invention is such that no differentiation is made between communication with proxies and communication with clients and recipients. The invention is the same whether communication is client to proxy, proxy to proxy or proxy to recipient. For example, if the communication path consists of a client connected to a recipient via two proxies in series, this invention could be applied to each of the three stages of transmission respectively.

The foregoing description refers to set up of calls but it will be understood that the invention may be applied to other kinds of communication set-up. In this respect, reference to calls should be read to cover any kind of communication link which may include audio, video, or other kinds of data amongst other things.

The present invention is particularly applicable to use with the SIP protocol and any derivates of it. However, it may be applied in other situations that may not use the SIP protocol. In particular, it would be equally applicable for use with other communication protocols that use a three-way handshake to initiate communication and do not issue a response to an acknowledgement message.

The scenario depicted in FIG. 3 results in the situation that handshaking with Server B at "5.6.7.8" begins. Server B transmits a "200 OK" message to the Client specifying the hostname "sip.other.com". The Client responds to this message by sending an "ACK" message to "sip.other.com", which according to the Client DNS cache resolves to "1.2.3.4" which is uncontactable. With no information telling the Client of the failure of "sip.other.com" at "1.2.3.4", the "ACK" message is sent but never delivered.

Since the Client is unaware that the ACK message has not been received by Server 1.2.3.4, the Client believes that the handshake was successful and that the call is active. Steps S6 to S8 may be repeated a number of times for further calls with each subsequent handshake attempt appearing to the Client to be successful but in reality not succeeding due to the DNS cache data identifying the failed Server 1.2.3.4. Unless the DNS cache information is reset by some other mechanism, the Client will never be able to successfully set up a call with that host.

FIG. 4 shows the operation of a modified protocol according to the present invention. Steps S1 to S8 are similar to those in FIG. 3 and in that respect, the basic operation of the modified protocol is similar to that of existing protocol. In FIG. 4, after step S8, the previous protocol results in the Client assuming that a satisfactory handshake had been completed but with the Server B effectively assuming that handshaking had failed because it had not received an ACK request.

However according to the modified protocol, if after a period of time, Server B does not receive an ACK request from the Client, it resends (S9) a "200 OK" response similar to step S7. The SIP protocol dictates that a Client must send an ACK request in response to all "200 OK" responses, so the Client responds (S10) with an ACK request. However, as the client is still holding the address 1.2.3.4 for Server B the ACK request is not received by Server B. Server B does not receive the ACK request and so after a period of time it again sends a 200 OK response.

Therefore in response to an "INVITE" message, Server B will repeatedly send out "200 OK" messages at intervals until it receives an "ACK" message from the Client or some other timeout mechanism stops it. Correspondingly, the Client will receive the "200 OK" messages and respond to each by transmitting an "ACK" message to the IP address in the DNS cache. Consequently, if the Client receives more than a certain number of "200 OK" messages, it can assume that the "ACK" messages have not been delivered and so take action to correct its DNS cache.

In the example of FIG. 4, the Client is configured to accept three transmissions of the "200 OK" response message before taking remedial action. When the fourth 200 OK response is received, the Client sends the ACK request as before (this is mandatory according to the standard protocol) but then initiates steps to rectify the invalid data in the DNS cache. The Client therefore clears the data stored in the DNS cache for host sip.other.com and refers to an external DNS Server to refresh the information about host sip.other.com. In this instance, the DNS Server should provide the Client with the alternative IP address, 5.6.7.8, for Server B.

Subsequently, the Client attempts to initiate a new call and sends an INVITE request (S11) to sip.example.com. It can obtain the IP address for sip.example.com from its DNS cache which will provide the correct IP address, in this instance 5.6.7.8. Server B receives the INVITE request and responds (S12) with a 200 OK response identifying the contact host name sip.other.com. In response to the "200 OK" response the Client sends (S13) an ACK request destined for sip.other.com. It refers to its DNS cache for this host name but as the entry has been deleted, it must carry out a new DNS lookup. The DNS Server should have been updated to reflect that Server A is no longer available and so, in this example, the lookup only returns a single address (5.6.7.8) to which the ACK request is sent in step S13. The new IP address for sip.other.com is then added to the DNS cache indicating that it resolves to 5.6.7.8, the address of Server B.

Assuming Server B is still online and able to receive the ACK request, the handshake will be completed and the call will be successfully established. This means that only the original call will have failed to complete the handshake but subsequent calls do successfully initiate.

The embodiment above is described in relation to the SIP protocol but it will be appreciated that the invention may be applied to other situations where three-way handshaking is used to establish a connection and where receipt of the final acknowledgement is assumed.

In the embodiment above, the client determines a problem to have occurred after receiving a predetermined number of "200 OK" messages but other mechanisms may be employed to determine that the ACK messages are not being received. For example, the client may react if it receives a "200 OK" message a predetermined time after the initial INVITE message.

The Server B repeats the sending of the "200 OK" messages in the above embodiment until it receives an ACK message. However, it may stop sending the messages after a predetermined time or number of resends to recognise the possibility that some other problem may be preventing communication between the client and the server.

In the embodiment above, sip.example.com and sip.other.com are used as exemplary domain names but relate to the same server. Different host names may be used for the same server for a variety of reasons as is well known in the field. In addition, proxy servers may be included on the signalling path between the client and the recipient. The scope of this invention is such that no differentiation is made between communication with proxies and communication with clients and recipients. The invention is the same whether communication is client to proxy, proxy to proxy or proxy to recipient. For example, if the communication path consists of a client connected to a recipient via two proxies in series, this invention could be applied to each of the three stages of transmission respectively.

The foregoing description refers to set up of calls but it will be understood that the invention may be applied to other kinds of communication set-up. In this respect, reference to calls should be read to cover any kind of communication link which may include audio, video, or other kinds of data amongst other things.

The present invention is particularly applicable to use with the SIP protocol and any derivates of it. However, it may be applied in other situations that may not use the SIP protocol. In particular, it would be equally applicable for use with other communication protocols that use a three-way handshake to initiate communication and do not issue a response to an acknowledgement message.

What is claimed is:

1. A method for monitoring the set-up of a communication link, the method comprising:
    a call initiator sending a call initialisation message to a recipient;
    the recipient sending a response message in response to the call initialisation message; and
    the call initiator sending an acknowledgement message to the recipient in response to the response message, the method further comprising:
    the recipient sending one or more further response messages if no acknowledgement message is received;
    the call initiator sending an acknowledgement message to the recipient in response to each of said further response messages; and
    determining that a fault condition exists after the call initiator receives a predetermined number of further response messages.

2. A method according to claim 1, further comprising the recipient sending each further response message after a predetermined delay, if no acknowledgement message is received.

3. A method according to claim 1, wherein the recipient stops sending said further response messages after a timeout period has elapsed.

4. A method according to claim 1, wherein the response message includes an identifier associated with the IP address of the recipient and the call initiator includes a cache for storing associations between IP addresses and identifiers, and wherein upon the identification of a fault condition, the call initiator determines the IP address associated with the identifier included in the further response message to be invalid.

5. A method according to claim 4, wherein the call initiator clears the invalid IP address associated with the identifier.

6. A method according to claim 4, wherein the call initiator performs a lookup to identify an IP address associated with an address identifier if said cache has no valid IP address associated with an identifier.

7. A method according to claim 1, wherein said call initialisation message is a SIP "INVITE" message, said response message is a SIP "200 OK" message and said acknowledgement message is a SIP "ACK" message.

8. A method of controlling a call initiator in a communication system, the method comprising:
    sending a call initialisation message to a recipient;
    receiving a response message from said recipient in response to the call initialisation message; and
    sending an acknowledgement message to said recipient in response to the receipt of a response message, the method further comprising:
    sending a further acknowledgement message to the recipient in response to each further response messages received from said recipient; and
    determining that a fault condition exists after the call initiator receives a predetermined number of further response messages.

9. A method according to claim 8, wherein the response message includes an identifier associated with the IP address of the recipient and the method further includes:
    maintaining a cache for storing associations between IP addresses and identifiers, and
    upon the identification of a fault condition, determining that the IP address associated with the identifier included in the further response message to be invalid.

10. A method according to claim 9, further comprising clearing the invalid IP address associated with the identifier from the cache.

11. A method according to claim 9, further comprising performing a lookup to identify an IP address associated with said identifier if said cache has no valid IP address associated with the identifier.

12. A method according to claim 8, wherein said call initialisation message is a SIP "INVITE" message, said response message is a SIP "200 OK" message and said acknowledgement message is a SIP "ACK" message.

13. A system for controlling a set-up of a communication link, the system comprising:
    a call initiator; and
    a recipient, wherein
    the call initiator is arranged to send a call initialisation message for reception by the recipient;
    the recipient is arranged for sending a response message in response to the call initialisation message;
    the call initiator is arranged for sending an acknowledgement message to the recipient in response to the response message,
    the recipient is arranged for sending one or more further response messages if no acknowledgement message is received from the recipient;
    the call initiator is arranged for sending an acknowledgement message to the recipient in response to each of said further response messages; and
    the call initiator is further arranged for determining that a fault condition exists after the call initiator receives a predetermined number of further response messages.

14. A system according to claim 13, wherein a received response message includes an identifier associated with the IP address of the recipient, and said call initiator comprises a cache to store associations between IP addresses and said identifier, and wherein, upon determining that a fault condition exists, the call initiator determines the IP address associated with the identifier included in the further response message to be invalid.

15. A system according to claim 14, further arranged to perform a lookup to identify an IP address associated with said identifier if said cache has no valid IP address associated with the identifier and store said IP address in said cache.

16. A system according to claim 14, wherein said call initiator is further arranged to clear the invalid IP address associated with the associated identifier from said cache.

17. A communication device for communicating with a recipient device comprising:
- a call initiator arranged to send a call initialisation message to a recipient; and
- reception means for receiving response messages from a recipient, wherein
- the call initiator is arranged to send an acknowledgement message when a response message is received by said reception means,
- the call initiator is further arranged to send further acknowledgement messages to the recipient in response to receipt of further response messages from the recipient; and
- the communication device determines that a fault exists after the reception means receives a predetermined number of further response messages, sent by the recipient when it does not receive an acknowledgement message from the call initiator.

18. A communication device according to claim 17, wherein a received response message includes an identifier associated with the IP address of the recipient, and said call initiator comprises a cache to store associations between IP addresses and said identifier, and wherein, upon determining that a fault exists, the call initiator determines the IP address associated with the identifier included in the further response message to be invalid.

19. A communication device according to claim 17, further arranged to perform a lookup to identify an IP address associated with said identifier if said cache has no valid IP address associated with the identifier and store said IP address in said cache.

20. A communication device according to claim 17, wherein said call initiator is further arranged to clear the invalid IP address associated with the associated identifier from said cache.

* * * * *